Aug. 7, 1928.
C. F. MOTZ
1,679,369
SAND BLASTING APPARATUS
Filed Oct. 30, 1926    2 Sheets-Sheet 2
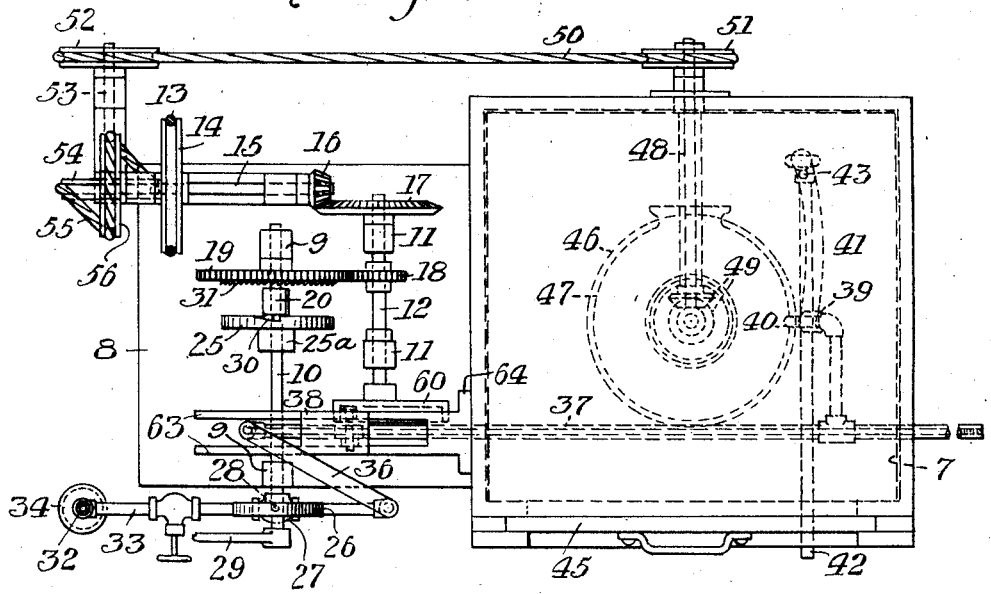
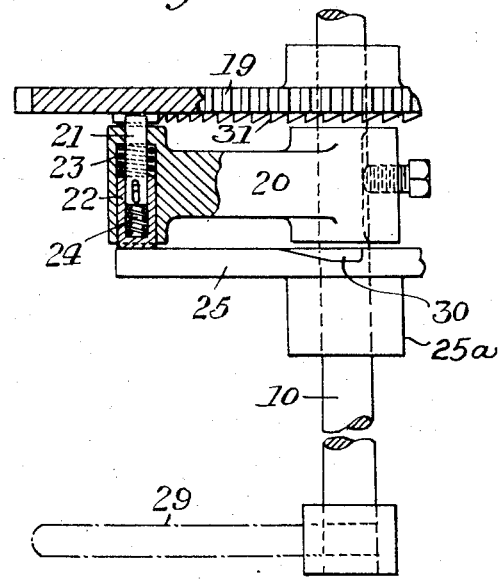
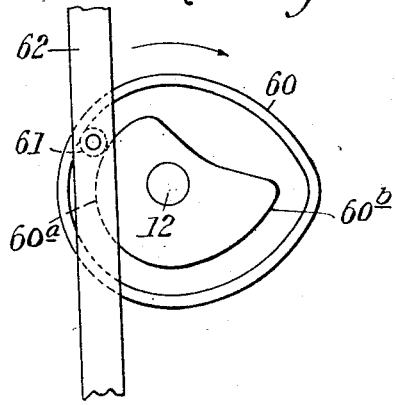
INVENTOR
Charles F. Motz
By Archworth Martin,
Attorney.

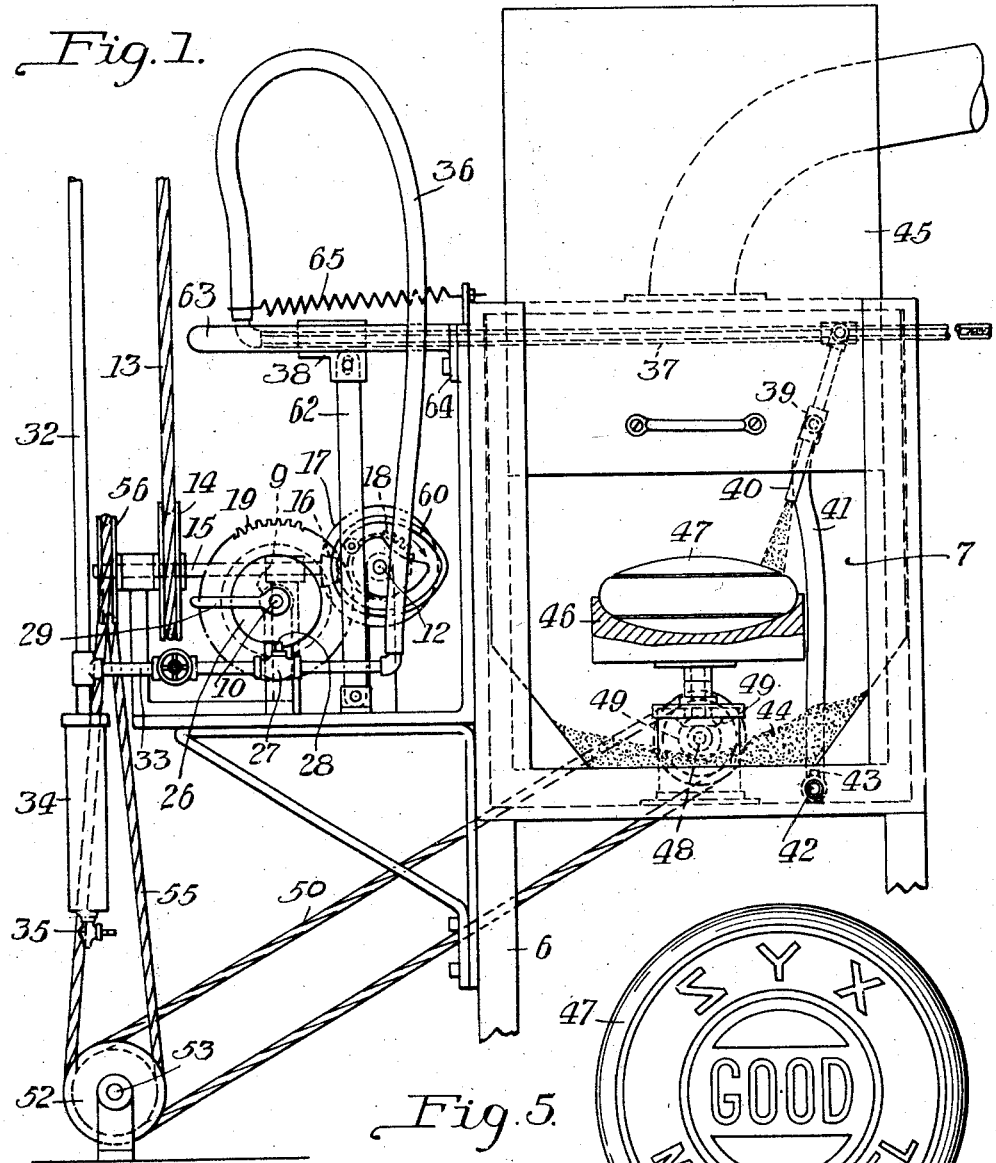

Patented Aug. 7, 1928.

1,679,369

UNITED STATES PATENT OFFICE.

CHARLES F. MOTZ, OF MONACA, PENNSYLVANIA, ASSIGNOR TO THE PHOENIX GLASS CO., OF MONACA, PENNSYLVANIA, A CORPORATION OF WEST VIRGINIA.

SAND-BLASTING APPARATUS.

Application filed October 30, 1926. Serial No. 145,137.

My invention relates to sand-blasting apparatus, and particularly to apparatus for sand-blasting glassware.

In sand-blasting glassware, to cut depressions therein, difficulty has been experienced in effecting a uniform cutting action, particularly on the surfaces of glass articles of circular form, by reason of the fact that there is a tendency for the glass to become too deeply cut at points adjacent to the central portion of the article, and not cut deeply enough at points adjacent to its periphery, because of differences in radius.

In the cutting of depressed or raised letters upon illuminated signs, which may also be provided with circular ribs or depressions, it has heretofore been common practice for a workman to manually move the sand-blast nozzle back and forth above the article, which may be simultaneously rotated, but results in the way of uniform cutting have depended upon the judgment and care used by the operator in moving the nozzle. Furthermore, the number of articles which could be cut by one operator has been quite limited.

My invention has for one of its objects, the provision of means for automatically and uniformly cutting glassware by the sand-blasting method, and for effecting a saving of labor over the older hand method referred to.

Another object of my invention is to simplify and improve generally the structure and operation of sand-blasting devices.

One form which my invention may take is shown in the accompanying drawing, wherein Figure 1 is a view, partially in elevation and partially in section, of apparatus embodying my invention; Fig. 2 is a plan view of the apparatus of Fig. 1; Fig. 3 is a sectional plan view, on an enlarged scale, of a portion of the apparatus of Fig. 2, with certain parts in other positions; Fig. 4 is an elevational view, on an enlarged scale, of a portion of the apparatus of Fig. 1, and Fig. 5 is a view showing one form of glass article that may be operated upon by my apparatus.

The apparatus is shown as mounted upon a framework, a fragmentary portion of which is indicated by the reference numeral 6. A chamber 7 is mounted upon the framework, and a base plate 8 is also secured thereto. Upon the base plate 8, I provide bearings 9 (Fig. 2) within which a shaft 10 is rotatably supported. Bearings 11 are also provided for supporting a shaft 12. The shaft 12 is driven from a belt 13 that may be connected to a line shaft (not shown), pulley 14, shaft 15, and bevel gear wheels 16 and 17. A pinion 18 is secured to the shaft 12 and meshes with a gear wheel 19 that is loosely mounted upon the shaft 10. A crank-like member 20 is keyed to the shaft 10, as shown more clearly in Fig. 3 and is provided at its outer end with a cylindrical passage within which telescopic plungers 21 and 22 are mounted. A compression spring 23 is mounted between one end of the plunger 22 and an end wall of the bore in the crank 20, and a compression spring 24 is interposed between the plunger 21 and the end wall of the plunger 22 into which the plunger 21 extends. These springs thereafter tend to hold the plungers 21 and 22 in extended position.

A disc 25 is loosely supported upon the shaft 10 and held against rotative movement therewith and movement longitudinally thereof, by an extension 25ª that is secured to the base 8. A second disc 26 for controlling an air valve 27 is rigidly secured to the shaft 10 and is provided with a notch in its periphery, as shown more clearly in Fig. 1 for permitting upward movement of a valve stem 28, upon completion of a revolution of the shaft, to permit closure of the valve 27. The valve 27 may be in the form of a check valve which will automatically close upon release of the stem 28, in a manner well known in the art, or of any other suitable construction.

In the position shown in Fig. 2, the gear wheel 19 is idle on the shaft 10, and the valve 27 is closed. In order to effect driving connection between the shaft 10 and the shaft 12, so that the disc 26 will be rotated to depress the valve stem 28, a handle 29 that is secured to the end of the shaft 10 is moved in a counter-clockwise direction to turn the shaft 10 and the crank 20, so that the plunger 22 will be moved out of the recess 30 that is formed in one side of the clutch disc 25, from the position shown in Fig. 2 toward that shown in Fig. 3. The spring 23 will thereupon be depressed and permit the spring 24 to be advanced to force the outer end of the plunger 21 into position to be engaged by one of the teeth 31 that are formed on the side of the gear wheel 19. Movement will thereby be transmitted from the shaft 12 to the shaft 10 and the valve-controlling disc 26. The spring 24 is limited in its range of movement to such extent that when the crank 20 has completed a revolution and the plunger 22 been forced into the recess 30 by the spring 23, the plunger 21 will be moved into the plunger 22 by the teeth 31 and hence out of driving engagement with such teeth, because the spring 24 is effective to advance the plunger 21 only a distance substantially equal to the advancement of the plunger 22 when it is moved out of the recess 30. The valve 27 is permitted to close upon the completion of each revolution of the shaft 10, at the time that the plunger 22 enters the recess 30 and the shaft 10 is disengaged from the gear wheel 19.

Compressed air for creating sand blast is admitted from a suitable source, through pipes 32 and 33. A condensing chamber 34 is connected to the lower end of the pipe 32 and is provided with a drain cock 35 through which condensed moisture may be drained, which moisture would interfere with the blowing of the sand. Air from the pipe 33 passes through the valve 27 and a flexible conduit 36, to a pipe 37. The pipe 37 is supported in a slide block 38 to be hereinafter described and is connected at its inner end to a header 39 that is provided with a nozzle 40. A flexible pipe 41 is connected, at its upper end, to the header 39 and at its lower end to a pipe 42. The pipe 42 extends along the bottom of the chamber 7 and communicates at its outer end with the atmosphere. A series of upwardly directed openings 43 are provided in the pipe 42 through which sand 44 that is present in the bottom of the chamber may flow and be drawn through the pipe 42 and the header 39, a suction being created in the pipes 41 and 42 by the air pressure which passes through the pipe 37 and the header.

The chamber 7 is provided with a door 45 that is vertically movable to permit access to the interior of the chamber. Within the chamber, a rotatable support 46 is mounted for the articles 47 that are to be operated upon by the sand blast. This carrier is driven by a shaft 48 and beveled gear wheels 49 that are suitably incased to protect them from the sand. The shaft 48 is driven by a belt 50 that passes around pulleys 51 and 52. The pulley 52 is secured to a shaft 53 that also carries a pulley 54 that is driven through a belt 55, from a pulley 56 that is secured to the shaft 15.

The articles to be operated upon by the sand blast are shown as sign display bowls which are commonly colored and illuminated interiorly. In order to render the bowls more attractive and to increase the durability of the insignia or decorations imposed thereon, the lettering and decorations are caused to stand out in relief by sand-blasting away the surrounding material, or I cut away the lettering and certain of the decorative portions so that they will be in the form of depressions in the body of the bowl. The treatment of the bowl to prevent action of the sand upon certain portions thereof is effected in a manner well-known in the art, as by covering said portions with a wax or other suitable material previous to subjecting the same to the sand blast.

The bowls 47, after being properly treated to protect certain portions thereof as above explained, are placed upon a carrier 46, which is normally slowly and constantly rotating, and the handle 29 is turned to open the valve 27 so that compressed air may enter and the blasting operation begin. Uniform distribution of the sand blast over the surface of the globe is effected by reciprocating the blast nozzle 40 radially of the globe. This reciprocation is effected by means of cam mechanism, which will be now described.

A cam disc 60 is secured to the shaft 12 and has engagement with a roller 61 that is journaled in a lever 62. The lever 62 is pivotally connected at its lower end to the base 8, and at its upper end has pin-and-slot connection with the block 38 through which the pipe 37 extends, and to which it is secured. The block 38 is slidably supported upon arms 63, of a bracket 64 that is bolted to the framework 6. A spring 65 normally holds the pipe 37 in forward position, from which it is retracted by the cam 60. The outer end of the pipe 37 is slidably supported in the side wall of the chamber 7. As the pipe 37 is reciprocated by the cam 60 and the spring 65, the nozzle 40 will be moved radially of the globe 47. The cam 60 is formed with a dwell portion 60$^a$ that is substantially coaxial with the shaft 12 and the roller 61 is in engagement with this dwell portion during the time that the blast nozzle is adjacent to the peripheral portion of the bowl 47, so that a greater blasting effect will be produced at such portion of the bowl, in order to adequately cut away the greater surface present at such distant point from the center of the bowl. The cam surface is of such form that the movement of the nozzle toward the center of the bowl is at a rapidly increasing rate, as indicated by the numeral 60$^b$, until substantially the exact central point of the bowl is reached, whereupon the cam roller will enter the depressed portion of the cam quickly so that the blast nozzle will be carried by the spring 65 rapidly to the peripheral portion of the bowl.

The gear reduction between the shafts 10 and 12 is such that the shaft 10 will make one revolution during a given number of cycles of movement of the blast nozzle, and the notch in the disc 26 is so positioned that it will come opposite to the valve stem 28 when the plunger 22 is opposite to the recess 30 so that the sand blast will be immediately shut off when the shaft 10 stops. The bowl 47 will preferably be given a number of revolutions during one revolution of the shaft 10. When one cycle of movement has been completed and the shaft 10 comes to rest, the bowl will be turned over so that the other side may be treated. As the rotation of the carrier 46 is rather slow, it is not necessary to stop movement thereof when turning the bowl or when removing it and placing another bowl on the carrier. It will be understood that the nozzle 40 could be moved past the center of the bowl and entirely across the face thereof, but I find it more convenient to reciprocate it across only substantially one-half the diameter of the bowl, since such arrangement simplifies the cam construction.

After the bowl has been cut on both sides, it is removed from the chamber 7 and the protective material or mask is removed, whereupon certain portions of the face of the bowl may be painted to increase the decorative effect produced by the cutting.

I claim as my invention:—

1. Glass-cutting apparatus, comprising means for rotating an article to be operated upon, a blast nozzle, and means for reciprocating the blast nozzle radially of the article, the movement of the nozzle being more rapid in one direction of radial movement than in the other.

2. Glass-cutting apparatus, comprising means for rotating an article to be operated upon, a blast nozzle, and means for reciprocating the blast nozzle radially of the article, the movement of the nozzle being more rapid in one direction of radial movement than in the other, and at a slower rate of speed when adjacent to the peripheral portion of the article.

3. Glass-cutting apparatus, comprising a blast nozzle, a driving shaft, a cam mounted thereon for moving said nozzle, a second shaft, a pinion mounted on the first named shaft, a gear wheel loosely mounted on the said second shaft and meshing with the pinion, a cam member mounted on the second named shaft and operable to maintain driving engagement between the gear wheel and the second named shaft during only a single revolution thereof, a second cam member on the last named shaft, an air supply valve for said nozzle, and a connection between the last named cam and said valve, whereby the valve is closed upon completion of each revolution of the said gear wheel.

4. Glass-cutting apparatus, comprising a blast nozzle, a driving shaft, a cam mounted thereon for moving said nozzle, a second shaft, a pinion mounted on the first named shaft, a gear wheel loosely mounted on the said second shaft and meshing with the pinion, a cam member mounted on the second named shaft and operable to maintain driving engagement between the gear wheel and the second named shaft during only a single revolution thereof, a second cam member on the last named shaft, an air supply valve for said nozzle, a connection between the last named cam and said valve, whereby the valve is closed upon completion of each revolution of the said gear wheel, and means independent of the first-named shaft for imparting movement to said second shaft to cause one of the cam members carried thereby to effect driving connection between the said gear wheel and its shaft and cause the other cam to permit opening of the valve.

5. Glass-cutting apparatus, comprising a rotatable support for an article to be cut, means for continuously rotating said support, a blast nozzle, means for supplying fluid pressure to said nozzle, means for reciprocating said nozzle, means for interrupting the fluid pressure supply at a predetermined period during movement of said nozzle, and manually operable means for again establishing the fluid pressure supply and effecting operative relation between said supply and said reciprocating means.

6. Glass-cutting apparatus comprising a blast nozzle, means for moving said nozzle in a predetermined path, driving mechanism for said means, means for supplying fluid pressure to said nozzle, means controlled by the said driving mechanism for interrupting the supply of fluid pressure, and means for maintaining said fluid supply means inactive until manually placed in operative relation to the driving mechanism.

In testimony whereof I, the said CHARLES F. MOTZ, have hereunto set my hand.

CHARLES F. MOTZ.